US009948463B2

(12) United States Patent
Tang et al.

(10) Patent No.: US 9,948,463 B2
(45) Date of Patent: Apr. 17, 2018

(54) MULTIVARIATE PUBLIC KEY SIGNATURE/VERIFICATION SYSTEM AND SIGNATURE/VERIFICATION METHOD

(71) Applicant: SOUTH CHINA UNIVERSITY OF TECHNOLOGY, Guangzhou, Guangdong Province (CN)

(72) Inventors: Shaohua Tang, Guangzhou (CN); Wuqiang Shen, Guangzhou (CN)

(73) Assignee: SOUTH CHINA UNIVERSITY OF TECHNOLOGY, Guangzhou, Guangdong (CN)

( * ) Notice: Subject to any disclaimer, the term of this patent is extended or adjusted under 35 U.S.C. 154(b) by 142 days.

(21) Appl. No.: 15/022,824

(22) PCT Filed: Dec. 18, 2013

(86) PCT No.: PCT/CN2013/089898
§ 371 (c)(1),
(2) Date: Mar. 17, 2016

(87) PCT Pub. No.: WO2015/039396
PCT Pub. Date: Mar. 26, 2015

(65) Prior Publication Data
US 2016/0234021 A1 Aug. 11, 2016

(30) Foreign Application Priority Data

Sep. 17, 2013 (CN) .......................... 2013 1 0425390

(51) Int. Cl.
*H04L 9/30* (2006.01)
*H04L 9/32* (2006.01)
*H04L 9/00* (2006.01)
(52) U.S. Cl.
CPC ............ *H04L 9/3093* (2013.01); *H04L 9/006* (2013.01); *H04L 9/3247* (2013.01)

(58) Field of Classification Search
None
See application file for complete search history.

(56) References Cited

U.S. PATENT DOCUMENTS 5,790,675 A * 8/1998 Patarin .................. H04L 9/3093
380/28
8,515,058 B1 * 8/2013 Gentry .................... H04L 9/008
380/28

(Continued)

FOREIGN PATENT DOCUMENTS

CN 101540673 A 9/2009
CN 101834724 A 9/2010

OTHER PUBLICATIONS

Jun. 9, 2014 Search Report issued in International Patent Application No. PCT/CN2013/089898.

*Primary Examiner* — Michael R Vaughan
(74) *Attorney, Agent, or Firm* — Oliff PLC

(57) ABSTRACT

Multivariate public key signature/verification system including a signature module and a verification module. The signature module contains a processor, first affine transformation inversion component, isomorphic inversion component, trapdoor component, isomorphic component, and second affine transformation inversion component. Corresponding computations are executed sequentially by the components on a message to be signed; solutions are generated after being processed by the trapdoor component; one solution is selected randomly and transmitted to the isomorphic component and second affine component for processing, and a signature generated is transmitted with the message to the processor. The verification module contains the processor and a public key transformation component. The signature is transmitted by the processor to the transformation component and substituted into each multivariate polynomial in a public key mapping. The processor judges (Continued)

whether the obtained data is equal to the message in a memory: if yes, the signature is valid, if not, it is invalid.

9 Claims, 1 Drawing Sheet

(56) References Cited

U.S. PATENT DOCUMENTS

| | | | |
|---|---|---|---|
| 2002/0095581 A1* | 7/2002 | Imai | H04L 9/3247 713/180 |
| 2007/0022293 A1* | 1/2007 | Hayashi | G06F 21/64 713/176 |
| 2008/0013716 A1* | 1/2008 | Ding | H04L 9/3093 380/30 |
| 2008/0037776 A1* | 2/2008 | Akiyama | H04L 9/3093 380/44 |
| 2009/0010428 A1* | 1/2009 | Delgosha | H04L 9/3093 380/30 |
| 2010/0183147 A1* | 7/2010 | Billet | H04L 9/3093 380/30 |
| 2013/0073855 A1* | 3/2013 | Kipnis | H04L 9/3093 713/171 |
| 2013/0129090 A1* | 5/2013 | Kipnis | H04L 9/3073 380/255 |
| 2013/0177151 A1* | 7/2013 | Sella | H04L 9/3093 380/30 |
| 2013/0294601 A9* | 11/2013 | Kipnis | H04L 9/3073 380/255 |
| 2014/0136843 A1* | 5/2014 | Sakumoto | H04L 9/3093 713/168 |
| 2014/0153717 A1* | 6/2014 | Sakumoto | H04L 9/3093 380/44 |
| 2014/0164780 A1* | 6/2014 | Sakumoto | H04L 9/3093 713/176 |
| 2014/0189361 A1* | 7/2014 | Sakumoto | H04L 9/3271 713/176 |
| 2014/0192981 A1* | 7/2014 | Hiwatari | H04L 9/3093 380/46 |
| 2014/0205087 A1* | 7/2014 | Sakumoto | H04L 9/3271 380/30 |
| 2014/0205088 A1* | 7/2014 | Sakumoto | H04L 9/3221 380/30 |
| 2014/0208110 A1* | 7/2014 | Hiwatari | H04L 9/3093 713/170 |
| 2014/0215222 A1* | 7/2014 | Sakumoto | H04L 9/3252 713/176 |
| 2014/0223193 A1* | 8/2014 | Sakumoto | H04L 9/3252 713/189 |
| 2014/0380062 A1* | 12/2014 | Sakumoto | H04L 9/3247 713/189 |
| 2015/0010144 A1* | 1/2015 | Sakumoto | H04L 9/3093 380/30 |
| 2016/0226664 A1* | 8/2016 | Tang | H04L 9/3093 |
| 2017/0070348 A1* | 3/2017 | Tang | H04L 9/32 |
| 2017/0222807 A1* | 8/2017 | Tang | H04L 9/0822 |

* cited by examiner

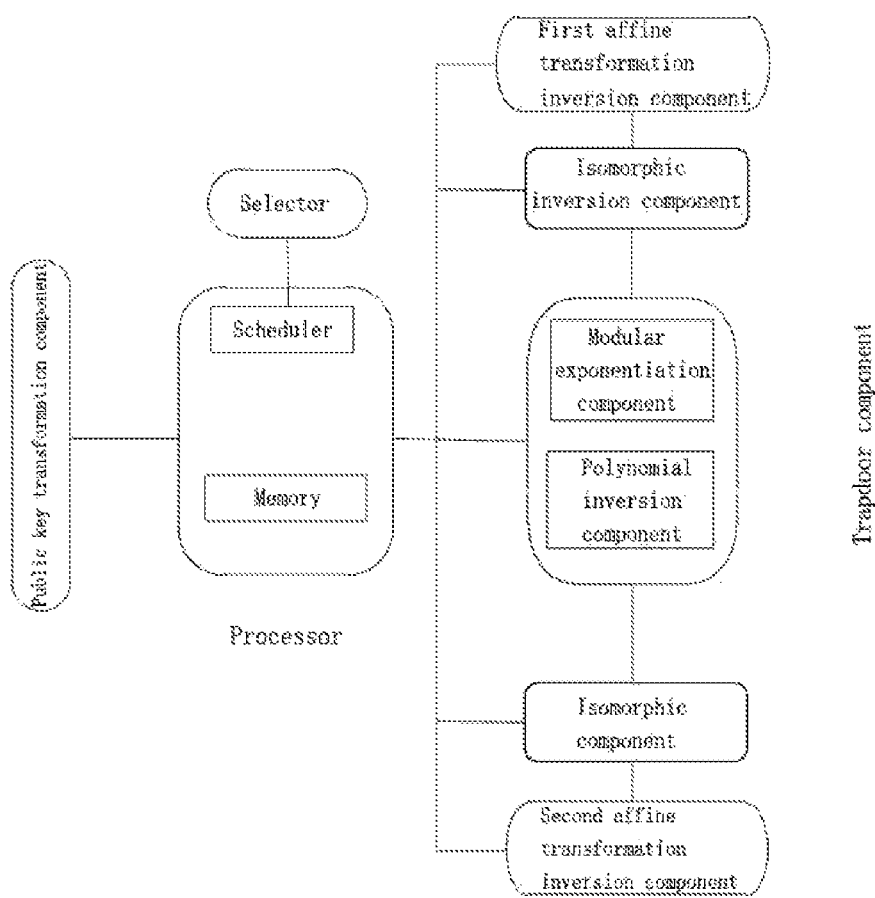

MULTIVARIATE PUBLIC KEY SIGNATURE/VERIFICATION SYSTEM AND SIGNATURE/VERIFICATION METHOD

TECHNICAL FIELD

The present invention relates to the field of information security, and in particular, to a multivariate public key signature/verification system and signature/verification method.

BACKGROUND ART

The cryptographic techniques are the core and foundation for information security and are widely applied to the fields of network communications, electronic commerce, banks and national defence and military. The cryptographic techniques comprise symmetric cryptography and asymmetric cryptography which is also referred to as public key cryptography.

At present, the security of the public key cryptography is mainly dependent on hard problems of large integer factorization and discrete logarithm solving, and the like, such as RSA, ECC, etc. However, after methods capable of implementing large integer factorization and discrete logarithm solving on quantum computers are proposed, this type of traditional public key cryptography has faced a huge threat, and various industries have been affected. Therefore, people have been working to find a cryptographic system capable of protecting against attacks from the quantum computers so as to satisfy the requirement of information security, and this type of system is called post quantum cryptography, one of which is the multivariate public key cryptography.

SUMMARY OF THE INVENTION

The primary object of the present invention is to overcome the disadvantages and shortcomings of the prior art, and provide a multivariate public key signature/verification system which has a high security and computation efficiency.

The other object of the present invention is to provide a multivariate public key signature/verification method which has a high security and computation efficiency.

The object of the present invention is implemented by means of the following technical solution:

A multivariate public key signature/verification system, containing:

A. a signature module for performing signature processing on a message to be signed, which comprises a processor, a first affine transformation inversion component, an isomorphic inversion component, a trapdoor component, an isomorphic component and a second affine transformation inversion component, with the trapdoor component containing a modular exponentiation component and a polynomial inversion component, wherein the message to be signed is stored by the processor and transmitted to the first affine transformation inversion component for an affine transformation inversion computation, and then result from the first affine transformation inversion component is transmitted to the isomorphic inversion component for an isomorphic inversion computation, and then result from the isomorphic inversion component is transmitted to the modular exponentiation component and the polynomial inversion component of the trapdoor component respectively for a modular exponentiation computation and a polynomial inversion computation, one or more solutions being obtained through the polynomial inversion computation to form a solution set; any solution is selected from the solution set and transmitted to the isomorphic component for an isomorphic computation, and then result from the isomorphic component is transmitted to the second affine transformation inversion component for an affine transformation inversion computation to generate a desired signature; and the processor sends the message together with the signature thereof to a terminal user; and B. a verification module for performing verification processing on a message and a signature thereof sent from other users to verify whether the signature is valid, which comprises the processor and a public key transformation component, wherein the processor stores the message and the signature thereof and transmits the signature to the public key transformation component; the public key transformation component substitutes the signature into each multivariate polynomial of a public key mapping, and data obtained are returned to the processor; and the processor judges whether the data is equal to the message in the processor: if yes, the processor outputs "1" to the terminal user which indicates that the signature is valid; and if not, the processor outputs "0" to the terminal user which indicates that the signature is invalid.

Said multivariate public key signature/verification system further contains a selector which is connected to the processor, wherein, when the selector is in an open state, the signature module of the system works; and when the selector is in a closed state, the verification module of the system works. In a general signature/verification system, user one uses the signature module to perform signature processing on the message to be signed and, after the signature is formed, transmits the signature and the original message to user two, and user two uses the verification module to verify whether the signature is valid, wherein the two modules form an entire signature/verification system, and vice versa: user two uses the signature module to perform signature and, after the signature is formed, transmits the signature and the original message to user one, and user one uses the verification module to verify whether the signature is valid. Therefore, the requirements can be satisfied only when one and the same user is provided with two different and separate devices at the same time, i.e. the signature module and the verification module, and this causes inconvenience to the users. However, said multivariate public key signature/verification system adopts a scheme containing a selector, and thus one and the same user only needs one and the same device and the user selects the device to perform signature or verification according to his own requirements, and this is very convenient.

Said processor contains a scheduler connected to the selector, wherein the open state and the closed state of the selector are identified and processed by the scheduler in the processor, and data stored in the processor is controlled and scheduled by the scheduler to the corresponding components for corresponding operations.

Said processor further contains a memory, wherein the storage of the data in the processor is accomplished by the memory.

A multivariate public key signature/verification method, containing steps in the following order:

(1) a signature process:

a. after a message to be signed is received, storing the message by a processor, and transmitting same to a first affine transformation inversion component for an affine transformation inversion computation;

b. then transmitting result of step a to an isomorphic inversion component for an isomorphic inversion computation;

c. then transmitting result of step b to a modular exponentiation component and a polynomial inversion component of a trapdoor component respectively for a modular exponentiation computation and a polynomial inversion computation, one or more solutions being obtained through the polynomial inversion computation;

d. selecting any solution from the solution set and transmitting same to an isomorphic component for an isomorphic computation;

e. then transmitting result of step d to a second affine transformation inversion component for an affine transformation inversion computation; and f. taking an ultimately obtained result as a signature of the message, and transmitting, by the processor, the message together with the signature thereof to a terminal user; and (2) a verification process:

a. transmitting a message and a signature thereof to the processor, and storing, by the processor, the message and the signature thereof, and then transmitting the signature to a public key transformation component; and b. substituting, by the public key transformation component, the signature into each multivariate polynomial of a public key mapping, and returning data obtained to the processor; and judging, by the processor, whether the data is equal to the stored message: if yes, outputting, by the processor, "1" to the terminal user which indicates that the signature is valid; and if not, outputting, by the processor, "0" to the terminal user which indicates that the signature is invalid.

With regard to said multivariate public key signature/verification method, said step (1) of signature process comprises:

a. after the message $(y_1', \ldots, y_n') \in F^n$ to be signed is received, storing the message $(y_1', \ldots, y_n') \in F^n$ by the processor and transmitting same to the first affine transformation inversion component for the affine transformation inversion computation $(\bar{y}_1, \ldots, \bar{y}_n) = T^{-1}(y_1', \ldots, y_n')$;

b. then transmitting $(\bar{y}_1, \ldots, \bar{y}_n)$ to the inversion component for the isomorphic inversion computation $\bar{Y} = \varphi^{-1}(\bar{y}_1, \ldots, \bar{y}_n)$;

c. then transmitting $\bar{Y}$ to the modular exponentiation component and the polynomial inversion component of the trapdoor component respectively for the modular exponentiation computation and the polynomial inversion computation, i.e. using, by the modular exponentiation component, a relationship expression $t \cdot v \equiv 1 \mod(q^n-1)$ to calculate inversion v of the t, and then calculate $\overline{cir Y} = \bar{Y}^{-v}$; and afterwards, using, by the polynomial inversion component, a probabilistic Berlekamp algorithm to gain one or more solutions of $g(\hat{X}) = \hat{Y}$ in the unknown $\hat{X}$, and since the polynomial equation may have multiple solutions and a maximum number of the solutions is up to d, denoting a solution set thereof as $\hat{X}_i (1 \leq i \leq d)$ d. selecting any solution $\bar{X}$ from the solution set $\hat{X}_i$ and transmitting same to the isomorphic component for the isomorphic computation $(\bar{x}_1, \ldots, \bar{x}_n) = \varphi(\bar{X})$;

e. then transmitting $(\bar{x}_1, \ldots, \bar{x}_n)$ to the second affine transformation inversion component for the affine transformation inversion computation $(x_1', \ldots, x_n') = S^{-1}(\bar{x}_1, \ldots, \bar{x}_n)$; and f. taking the ultimately obtained result $(x_1', \ldots, x_n')$ as the signature of the message, and transmitting, by the processor, the message $(y_1', \ldots, y_n')$ together with the signature thereof $(x_1', \ldots, x_n')$ to a terminal user; and said step (2) of verification process contains:

a. transmitting the message $(y_1', \ldots, y_n')$ and the signature thereof $(x_1', \ldots, x_n')$ to the processor, and storing them by the processor, and then transmitting the signature $(x_1', \ldots, x_n')$ to the public key transformation component; and b. substituting, by the public key transformation component, the signature $(x_1', \ldots, x_n')$ into each multivariate polynomial of the public key mapping $P(x_1, \ldots, x_n)$ i.e. respectively calculating $p_1(x_1', \ldots, x_n'), \ldots, p_n(x_1', \ldots, x_n')$, with the values thereof respectively denoted as $y_1'', \ldots, y_n''$; and transmitting, by the public key transformation component, $y_1'', \ldots, y_n''$ to the processor; and judging, by the processor, whether $y_1'', \ldots, y_n''$ is equal to the originally stored message $(y_1', \ldots, y_n')$: if yes, outputting, by the processor, "1" to the terminal user which indicates that the signature is valid; and if not, outputting, by the processor, "0" to the terminal user which indicates that the signature is invalid.

Said multivariate public key signature/verification method further contains the following step prior to the step (1) of signature process: when the selector is in the open state, the signature module of the system works, wherein the selector is connected to the processor; and the following step prior to the step (2) of verification process: when the selector is in the closed state, the verification module of the system works, wherein the selector is connected to the processor.

Said processor contains a scheduler connected to the selector, wherein the open state and the closed state of the selector are identified and processed by the scheduler in the processor, and data stored in the processor is controlled and scheduled by the scheduler to the corresponding components for corresponding operations.

Said processor further contains a memory, wherein the storage of the data in the processor is accomplished by the memory.

In comparison to the prior art, the present invention has the following advantages and beneficial effects:

Firstly, under appropriate parameter selection, our scheme can resist the currently known algebraic attacks on the multivariate public key cryptography, and thus has a high security.

Secondly, the encryption and decryption need a short time and responds fast.

DESCRIPTION OF THE DRAWING

FIG. 1 is a structural schematic diagram of a multivariate public key signature/verification system.

DETAILED DESCRIPTION OF THE INVENTION

As shown in FIG. 1, a structural schematic diagram of a multivariate public key signature/verification system contains:

A. a selector which is connected to a scheduler in a processor, wherein, when the selector is in an open state, a signature module of the system works; and when the selector is in a closed state, a verification module of the system works;

B. a signature module for performing signature processing on a message to be signed, which comprises a processor, a first affine transformation inversion component, an isomorphic inversion component, a trapdoor component, an isomorphic component and a second affine transformation inversion component, with the trapdoor component containing a modular exponentiation component and a polynomial inversion component, wherein the message to be signed is stored first by the processor in the memory and transmitted to the first affine transformation inversion component for an affine transformation inversion computation, and then result from the first affine transformation inversion component is transmitted to the isomorphic inversion component for an isomorphic inversion computation, and then result from the isomorphic inversion component is transmitted to the modular exponentiation component and the polynomial inversion component of the trapdoor component respectively for a modular exponentiation computation and a polynomial inversion computation, one or more solutions being obtained through the polynomial inversion computation; if multiple solutions are generated, any solution is selected from the solution set to be transmitted to the isomorphic component for an isomorphic computation, otherwise, the solution is directly transmitted to the isomorphic component for the isomorphic computation, and after the isomorphic computation is accomplished, relevant data are transmitted to the second affine transformation inversion component for an affine transformation inversion computation to generate a desired signature; and finally the signature is transmitted to the processor and the processor sends the signature together with the corresponding message thereof to a terminal user; and C. a verification module for performing verification processing on a certain message and a signature thereof sent from other users to verify whether the signature is valid, which contains the processor and a public key transformation component, wherein after the message and the signature thereof are transmitted to the processor, the processor stores them and transmits the signature to the public key transformation component; the public key transformation component substitutes the signature into each multivariate polynomial of a public key mapping, and data obtained are returned to the processor; and the processor judges whether the data is equal to the message in the memory: if yes, the processor outputs a "1" to the terminal user which indicates that the signature is valid; and if not, the processor outputs a "0" to the terminal user which indicates that the signature is invalid.

Initialization needs to be performed before the multivariate public key signature/verification system is used for the first time, as shown below:

(1) Arithmetic computations of all components of the device except the trapdoor component are based on a finite field F having a cardinality of q and a characteristic of 2, where $q=2^k$, and $k \in N$ (2) An irreducible polynomial $f(y) \in F[y]$ having a degree of $n(\in N)$ is selected, and then an n-dimensional extension field $E=F[y]/(f(y))$ of the finite field F is defined, wherein, obviously, the extension field E is isomorphic to $F_{q^n}$, and the number of elements thereof is $q^n$, and all computations of the trapdoor component are on the basis of the extension field E.

(3) Let the number of equations of the multivariate public key cryptography system be n, and the number of variables also be n.

(4) In the isomorphic component, let $\varphi: E \to F^n$ be a standard F-linear isomorphism of the extension field E to $F^n$, which has the following characteristic:

$$\varphi(a_0+a_1x+\ldots+a_{n-1}x^{n-1})=(a_0,a_1,\ldots,a_{n-1}),$$
$$a_{i(0 \le i \le n)} \in F.$$

Similarly, in the isomorphic inversion component, $\varphi^{-1}$ is defined as an isomorphic mapping of $F^n$ to E, which has the following characteristic:

$$\varphi^{-1}(a_0,a_1,\ldots,a_{n-1})=(a_0+a_1x+\ldots+a_{n-1}x^{n-1}),$$
$$a_{i(0 \le i \le n)} \in F.$$

(5) In the first affine transformation inversion component, let $T(\bar{y}_1,\ldots,\bar{y}_n)=(y_1,\ldots,y_n)$ be randomly selected invertible affine transformation from $F^n$ to $F^n$; and similarly, in the second affine transformation inversion component, let $S(x_1,\ldots,x_n)=(\bar{x}_1,\ldots,\bar{x}_n)$ be a randomly selected invertible affine transformation from $F^n$ to $F^n$.

(6) In the trapdoor component, a trapdoor one-way function G(X) is defined on the extension field E, which has the form as follows $$G(X) = g(X)^t,$$

where $$g(X) = \prod_{i=1}^{d}(X-h_i),$$

$X, h_i \in E,$ $d = deg(g(X)),$ $D = deg(G(X)),$ $t \in Z_{q^n},$ and $gcd(t, q^n-1)=1$. In addition, v is denoted as inversion of t, and then there is a relationship expression $t \cdot v \equiv 1 \mod(q^n-1)$.

(7) In the public key transformation component, $\bar{P}$ is set as a central mapping from $F^n$ to $F^n$, which has the form of:

$$\bar{P}(x_1,\ldots,x_n)=(\bar{p}_1(x_1,\ldots,x_n),\ldots,\bar{p}_n(x_1,\ldots,x_n))$$

Where $\bar{p}_i(i \in N, 1 \le i \le n)$ is an n-variate polynomial on the base field F.

(8) In the public key transformation component, P is also set as a public key mapping from $F^n$ to $F^n$, which has the form of:

$$P(x_1,\ldots,x_n)=(p_1(x_1,\ldots,x_n),\ldots,p_n(x_1,\ldots,x_n)),$$

where $p_i(i \in N, 1 \le i \le n)$ is an n-variate polynomial on the base field F.

(9) The central mapping $\bar{P}$ and the public key mapping P are initialized, let them respectively:

$$\bar{P}=\varphi \circ G \circ \varphi^{-1}(x_1,\ldots,x_n)$$

$$P=T \circ \bar{P} \circ S=T \circ \varphi \circ G \circ \varphi^{-1} \circ S(x_1,\ldots,x_n).$$

(10) The data of the above relevant mapping are saved in the memory after system initialization and, in the system working process, are controlled and scheduled by the scheduler in the processor to the corresponding components for corresponding operations.

A multivariate public key signature/verification method, containing steps in the following order:

(1) a signature process:

a. when the selector is in an open state, the signature module of the system works, the selector being connected to the scheduler of the processor: after the message $(y_1',\ldots,y_n') \in F^n$ to be signed is received, storing, by the processor, the message $(y_1',\ldots,y_n') \in F^n$ and transmitting same to the first affine transformation inversion component for the affine transformation inversion computation $(\bar{y}_1, \ldots, \bar{y}_n) = T^{-1}(y_1', \ldots, y_n')$;

b. then transmitting $(\bar{y}_1, \ldots, \bar{y}_n)$ to the isomorphic inversion component for the isomorphic inversion computation $\bar{Y} = \varphi^{-1}(\bar{y}_1, \ldots, \bar{y}_n)$;

c. then transmitting $\bar{Y}$ to the modular exponentiation component and the polynomial inversion component of the trapdoor component respectively for the modular exponentiation computation and the polynomial inversion computation, i.e. using, by the modular exponentiation component, a relationship expression $t \cdot v \equiv 1 \mod(q^n-1)$ to calculate inversion v of the t, and then calculate $\hat{Y} = \bar{Y}^{-v}$; and afterwards, using, by the polynomial inversion component, a probabilistic Berlekamp algorithm to gain one or more solutions of $g(\hat{X}) = \hat{Y}$ in the unknown $\hat{X}$, and since the polynomial equation may have multiple solutions and a maximum number of the solutions is up to d, denoting a solution set thereof as $\hat{X}_i(1 \leq i \leq d)$ d. selecting any solution $\bar{X}$ from the solution set $\hat{X}_i$ and transmitting same to the isomorphic component for the isomorphic computation $(\bar{x}_1, \ldots, \bar{x}_n) = \varphi(\bar{X})$;

e. then transmitting $(\bar{x}_1, \ldots, \bar{x}_n)$ to the second affine transformation inversion component for the affine transformation inversion computation $(x_1', \ldots, x_n') = S^{-1}(\bar{x}_1, \ldots, \bar{x}_n)$; and f. taking the ultimately obtained result $(x_1', \ldots, x_n')$ as the signature of the message, and transmitting same to the processor; and g. transmitting, by the processor, the message $(x_1', \ldots, x_n')$ together with the signature thereof $(x_1', \ldots, x_n')$ to a terminal user; and (2) a verification process:

a. when the selector is in a closed state, the verification module of the system works, the selector being connected to the scheduler of the processor: transmitting the message $(y_1', \ldots, y_n')$ and the signature thereof $(x_1', \ldots, x_n')$ to the processor, and saving them in the memory by the processor, and then transmitting the signature $(x_1', \ldots, x_n')$ to the public key transformation component; and b. substituting, by the public key transformation component, the signature $(x_1', \ldots, x_n')$ into each multivariate polynomial of the public key mapping $P(x_1, \ldots, x_n)$, i.e. respectively calculating $p_1(x_1', \ldots, x_n'), \ldots, p_n(x_1', \ldots, x_n')$, with the values thereof respectively denoted as $y_1'', \ldots, y_n''$; and transmitting, by the public key transformation component, $y_1'', \ldots, y_n''$ to the processor; and judging, by the processor, whether $y_1'', \ldots, y_n''$ is equal to the originally stored message $(y_1', \ldots, y_n')$: if yes, outputting, by the processor, "1" to the terminal user which indicates that the signature is valid; and if not, outputting, by the processor, a "0" to the terminal user which indicates that the signature is invalid.

The initialization process of the system is introduced in detail with a specific example below:

(1) Computations of all the components except the trapdoor component are on the basis of a finite field F having a cardinality q=2, where the base field F contains 2 elements, and these elements are respectively $\{0,1\}$.

(2) An irreducible polynomial $f(y) = y^4 + y + 1$ is selected, and then the extension field $E = F[Y]/f(y)$ of F is defined, which contains $(2^2)^4 = 2^8$ elements.

(3) The number of equations and the number of variables in the system are both n=4.

(4) In the isomorphic component, there is an equation $\varphi(a_0 + a_1 x + a_2 x^2 + a_3 x^3) = (a_0, a_1, a_2, a_3)$; and in an isomorphic inversion component, there is an equation $\varphi^{-1}(a_0, a_1, a_2, a_3) = (a_0 + a_1 x + a_2 x^2 + a_3 x^3)$.

(5) In the first affine transformation inversion component, initialization is performed:

$$T = \begin{pmatrix} 1 & 1 & 1 & 1 \\ 1 & 0 & 0 & 0 \\ 0 & 1 & 0 & 0 \\ 1 & 0 & 0 & 1 \end{pmatrix} \begin{pmatrix} x_1 \\ x_2 \\ x_3 \\ x_4 \end{pmatrix} + \begin{pmatrix} 1 \\ 1 \\ 0 \\ 1 \end{pmatrix},$$

and in the second affine transformation inversion component, initialization is performed:

$$S = \begin{pmatrix} 1 & 1 & 0 & 0 \\ 0 & 0 & 0 & 1 \\ 1 & 0 & 0 & 0 \\ 0 & 1 & 1 & 1 \end{pmatrix} \begin{pmatrix} x_1 \\ x_2 \\ x_3 \\ x_4 \end{pmatrix} + \begin{pmatrix} 1 \\ 0 \\ 1 \\ 0 \end{pmatrix}.$$

(6) In the trapdoor component, g is initialized to be $$g(X) = [X - (y^2 + 1)][X - (y + 1)][X - (y^3 + y^2 + y)][X - (y^2 + 1)],$$

then, d=4;

in addition, initialization is performed t=8, and then $$G(X) = g(X)^8 = X^{32} + (y^3 + 1)X^{24} + y^2 X^{16} + (y^3 y + 1)X^3 y^3 + 1.$$

(7) In the public key transformation component, the specific equations of the public key transformation P is easily obtained through the equation $P = T \circ \bar{P} \circ S = T \circ \varphi \circ G \circ \varphi^{-1} \circ S(x_1, x_2, x_3, x_4)$, which respectively comprise the following four equations:

$$p_1 = x_1 x_2 + x_1 x_3 + x_2 x_3 + x_2 + x_3 x_4 + x_3 + 1,$$

$$p_2 = x_1 x_2 + x_3 + x_2 x_3 + x_2 + x_3 x_4 + x_4 + 1,$$

$$p_3 = x_1 x_3 + x_2 x_4 + x_4$$

$$p_4 = x_1 x_3 + x_1 x_4 + x_1 + x_2 x_3 + x_3 + 1.$$

After the initialization finishes, the system can be normally used.

After the system initialization, the signature of the message (1, 1, 1, 0) and the verification thereof will be described in detail below.

The signature process:

(1) The selector is in the open state;

(2) for the message to be signed (1, 1, 1, 0), an input transmits same to the processor and stores same in the memory, and then the processor transmits same to the first affine transformation inversion component;

(3) after receiving the data (1, 1, 1, 0), the first affine transformation inversion component firstly interacts with the processor, calls a program and calculates $T^1(1, 1, 1, 0) = (0, 1, 0, 1)$, and then transmits the result (0, 1, 0, 1) to the isomorphic inversion component;

(4) after receiving the data (0, 1, 0, 1), the isomorphic inversion component firstly interacts with the processor, and then acts on the data to map same into elements $y^3 + y$ on the extension field F, and transmits the elements to the trapdoor component;

(5) after receiving the data $y^3 + y$, the trapdoor component firstly interacts with the processor, and then calls a modular exponentiation sub-component to calculate inversion of t, $v=2$, and then calculates $(y^3+y)^2$ to get the result thereof $y^3$; and afterwards, the trapdoor component calls a polynomial inversion sub-component to solve the solution of the equation $g(X)=y^3$ in the unknown X, that is, the solution of the equation $$[X-(y^2+1)][X-(y+1)][X-(y^3y^2+y)][X-(y^2+1)]=y^3$$

where the solution set of the equation is $\{y^2+y+1, y^3+y+1\}$; and finally, the trapdoor component randomly selects one element of the solution set, and here let the trapdoor component select $y^3+y+1$ and transmit same to the isomorphic component;

(6) after receiving the data $y^3+y+1$, the isomorphic component firstly interacts with the processor, and then maps same into a 4-dimensional vector on the base field F to obtain (1, 1, 0, 1); and finally, the isomorphic component delivers the data (1, 1, 0, 1) to the second affine transformation inversion component;

(7) after receiving the data set (1, 1, 0, 1), the second affine transformation inversion component interacts with the processor, runs a program and calculates $S^{-1}(1, 1, 0, 1)$ to obtain the result (1, 1, 1, 1), and finally returns the data to the memory; and (8) the processor treats (1, 1, 1, 1) as the signature of the message (1, 1, 1, 0), and then it outputs the "message-signature pair" (1, 1, 1, 0)||(1, 1, 1, 1) to the user (the apparatus), and at this point, the signature process ends; and the verification process:

(1) the selector is in the closed state;

(2) for the "message-signature pair" (1, 1, 1, 0)||(1, 1, 1, 1), the input transmits same to the processor and stores same in the memory, and then the processor transmits the message (1, 1, 1, 1) to the public key transformation component;

(3) after receiving the data (1, 1, 1, 1), the public key transformation component interacts with the processor, calls a function P to calculate $(p_1(1, 1, 1, 1), p_2(1, 1, 1, 1), p_3(1, 1, 1, 1), p_4(1, 1, 1, 1))$, obtain the result res=(1, 1, 1, 0), and then the public key transformation component returns the result res=(1, 1, 1, 0) to the memory; and (4) the processor verifies whether res=(1, 1, 1, 0) is equal to the message (1, 1, 1, 0) in the original "message-signature pair", and obviously, the two are equal here, so the processor outputs "1" to the terminal user or apparatus to indicate that the signature is valid.

The above-mentioned embodiment is a simple implementation of the present invention, but the implementations of the present invention are not limited to the above-mentioned embodiment. The system parameters recommended in the present invention are: $q=2$, $n=128$, $d=6$ and $t=64$; and the security level thereof can be up to $2^{90}$. Any other change, modification, replacement, combination, simplification made without departing from the spirit or principles of the present invention should all be equivalent substitutions and be included within the scope of the present invention.

The invention claimed is:

1. A multivariate public key signature/verification system comprising:
   a signature module which comprises a first processor containing a first memory, a first affine transformation inversion component, an isomorphic inversion component, a trapdoor component, an isomorphic component and a second affine transformation inversion component, with the trapdoor component containing a modular exponentiation component and a polynomial inversion component, wherein a first message to be signed is stored by the first processor and transmitted to the first affine transformation inversion component for an affine transformation inversion computation, and then a first result from the first affine transformation inversion component is transmitted to the isomorphic inversion component for an isomorphic inversion computation, and then a second result from the isomorphic inversion component is transmitted to the modular exponentiation component and the polynomial inversion component of the trapdoor component respectively for a modular exponentiation computation and a polynomial inversion computation, one or more solutions being obtained through the polynomial inversion computation to form a solution set; any solution is selected from a solution set and transmitted to the isomorphic component for an isomorphic computation, and then a third result from the isomorphic component is transmitted to the second affine transformation inversion component for an affine transformation inversion computation to generate a first signature; and the processor sends the first message to be signed together with the first signature thereof to a terminal user; and
   a verification module which comprises a second processor containing a second memory and a public key transformation component, wherein the second processor stores the second message and the second signature thereof and transmits the second signature to the public key transformation component; the public key transformation component substitutes the second signature into each multivariate polynomial of a public key mapping, and data obtained are returned to the second processor; and the second processor judges whether the data is equal to the second message in the second processor: if yes, the second processor outputs a "1" to the terminal user which indicates that the second signature is valid; and if not, the second processor outputs a "0" to the terminal user which indicates that the second signature is invalid.

2. The multivariate public key signature/verification system according to claim 1, wherein the system further comprises a selector which is connected to the first processor or the second processor, when the selector is in an open state, the signature module of the system works; and when the selector is in a closed state, the verification module of the system works.

3. The multivariate public key signature/verification system according to claim 2, wherein each of the first processor and the second processor comprises a scheduler connected to the selector, the open state and the closed state of the selector are identified and processed by a scheduler in the first processor and the second processor, and data stored in the first processor or the second processor is controlled and scheduled by the scheduler to the corresponding components for corresponding operations.

4. The multivariate public key signature/verification system according to claim 1, wherein a storage of the data in the first processor and the second processor is accomplished by the first memory and the second memory, respectively.

5. A multivariate public key signature/verification method, comprising:

(1) a signature process:
   a. after a first message to be signed is received, storing the first message by a first processor containing a first memory, and transmitting the first message to a first affine transformation inversion component for an affine transformation inversion computation;
   b. transmitting a first result of step a to an isomorphic inversion component for an isomorphic inversion computation;

c. transmitting a second result of step b to a modular exponentiation component and a polynomial inversion component of a trapdoor component respectively for a modular exponentiation computation and a polynomial inversion computation, one or more solutions being obtained through the polynomial inversion computation to form a solution set;

d. selecting any solution from the solution set and transmitting the selected solution to an isomorphic component for an isomorphic computation;

e. transmitting a third result of step d to a second affine transformation inversion component for an affine transformation inversion computation; and f. taking an ultimately obtained result as a first signature of the first message, and transmitting, by the first processor, the first message together with the first signature thereof to a terminal user; and (2) a verification process:

a. transmitting a second message and a second signature thereof to a second processor containing a second memory, and storing, by the second processor, the second message and the second signature thereof, and then transmitting the second signature to a public key transformation component; and b. substituting, by the public key transformation component, the second signature into each multivariate polynomial of a public key mapping, and returning data obtained to the second processor; and judging, by the second processor, whether the data is equal to the stored message: if yes, outputting, by the second processor, "1" to the terminal user which indicates that the second signature is valid; and if not, outputting, by the second processor, "0" to the terminal user which indicates that the second signature is invalid.

6. The multivariate public key signature/verification method according to claim 5, wherein the signature process comprises:

a. after the first message $(y_1', \ldots, y_n') \in F^n$ to be signed is received, storing the first message $(y_1', \ldots, y_n') \in F^n$ by the first processor and transmitting the first message to the first affine transformation inversion component for the affine transformation inversion computation $(\bar{y}_1, \ldots, \bar{y}_n) = T^{-1}(y_1', \ldots, y_n')$;

b. transmitting $(\bar{y}_1, \ldots, \bar{y}_n)$ to the isomorphic inversion component for the isomorphic inversion computation $\bar{Y} = \varphi^{-1}(\bar{y}_1, \ldots, \bar{y}_n)$;

c. transmitting $\bar{Y}$ to the modular exponentiation component and the polynomial inversion component of the trapdoor component respectively for the modular exponentiation computation and the polynomial inversion computation, i.e. using, by the modular exponentiation component, a relationship expression $t \cdot v \equiv 1 \mod(q^n - 1)$ to calculate inversion v of the t, and then calculate $\hat{Y} = \bar{Y}^v$ and afterwards, using, by the polynomial inversion component, a probabilistic Berlekamp algorithm to gain one or more solutions of $g(\hat{X}) = \hat{Y}$ in a unknown $\hat{X}$, and since the polynomial equation may have multiple solutions and a maximum number of the solutions is up to d, denoting a solution set thereof as $\hat{X}_i$ ($1 \leq i \leq d$);

d. selecting any solution $\bar{X}$ from the solution set $\hat{X}_i$ and transmitting the selected solution to the isomorphic component for the isomorphic computation $(\bar{x}_1, \ldots, \bar{x}_n) = \varphi(\bar{X})$;

e. transmitting $(\bar{x}_1, \ldots, \bar{x}_n)$ to the second affine transformation inversion component for the affine transformation inversion computation $(x_1', \ldots, x_n') = S^{-1}(\bar{x}_1, \ldots, \bar{x}_n)$; and f. taking the ultimately obtained result $(x_1', \ldots, x_n')$ as the first signature of the first message, and transmitting, by the first processor, the first message $(y_1', \ldots, y_n')$ together with the first signature $(x_1', \ldots, x_n')$ to a terminal user; and the verification process comprises:

a. transmitting the second message $(y_1', \ldots, y_n')$ and the second signature $(x_1', \ldots, x_n')$ to the second processor, and storing the second message and the second signature by the second processor, and then transmitting the second signature $(x_1', \ldots, x_n')$ to the public key transformation component; and b. substituting, by the public key transformation component, the second signature $(x_1', \ldots, x_n')$ into each multivariate polynomial of the public key mapping $P(x_1, \ldots, x_n)$, i.e. respectively calculating $p_1(x_1', \ldots, x_n'), \ldots, p_n(x_1', \ldots, x_n')$, with the values thereof respectively denoted as $y_1'', \ldots, y_n''$; and transmitting, by the public key transformation component, $y_1'', \ldots, y_n''$ to the second processor; and judging, by the second processor, whether $y_1'', \ldots, y_n''$ is equal to the originally stored message $(y_1', \ldots, y_n')$: if yes, outputting, by the second processor, "1" to the terminal user which indicates that the second signature is valid; and if not, outputting, by the second processor, "0" to the terminal user which indicates that the second signature is invalid.

7. The multivariate public key signature/verification method according to claim 5, wherein prior to the step (1) of signature process, the method further comprises: when a selector is in an open state, the signature module of the system works, wherein the selector is connected to the first processor or the second processor; and prior to the step (2) of verification process, the method further comprises when the selector is in a closed state, the verification module of the system works, wherein the selector is connected to the first processor or the second processor.

8. The multivariate public key signature/verification method according to claim 7, wherein each of the first processor and the second processor comprises a scheduler, wherein the selector is connected to the scheduler; the open state and the closed state of the selector are identified and processed by the scheduler in the first processor or the second processor; and data stored in the first processor or the second processor is controlled and scheduled by the scheduler to the corresponding components for corresponding operations.

9. The multivariate public key signature/verification method according to claim 5, wherein the storage of the data in the first processor or the second processor is accomplished by the first memory or the second memory, respectively.

* * * * *